(12) United States Patent
Choi et al.

(10) Patent No.: US 12,258,282 B2
(45) Date of Patent: Mar. 25, 2025

(54) METHOD FOR PRODUCING NICKEL SULFATE SOLUTION FOR SECONDARY BATTERY FROM NICKEL CATHODE

(71) Applicants: KOREA ZINC CO., LTD., Seoul (KR); KEMCO, Seoul (KR)

(72) Inventors: Heon Sik Choi, Ulsan (KR); Jae Hoon Joo, Ulsan (KR); Tae Kyung Lee, Seoul (KR)

(73) Assignees: KOREA ZINC CO., LTD., Seoul (KR); KEMCO, Seoul (KR)

( * ) Notice: Subject to any disclaimer, the term of this patent is extended or adjusted under 35 U.S.C. 154(b) by 0 days.

(21) Appl. No.: 18/472,603

(22) Filed: Sep. 22, 2023

(65) Prior Publication Data

US 2024/0228321 A1 Jul. 11, 2024

Related U.S. Application Data

(63) Continuation of application No. PCT/KR2023/004406, filed on Mar. 31, 2023.

(30) Foreign Application Priority Data

Jan. 11, 2023 (KR) .................. 10-2023-0004092

(51) Int. Cl.
*C01G 53/10* (2006.01)
*B09B 3/80* (2022.01)
(Continued)

(52) U.S. Cl.
CPC ............... *C01G 53/10* (2013.01); *B09B 3/80* (2022.01); *C22B 23/043* (2013.01); *H01M 4/5815* (2013.01); *H01M 10/54* (2013.01); *B09B 2101/16* (2022.01); *C01P 2006/40* (2013.01); *H01M 2004/028* (2013.01)

(58) Field of Classification Search
CPC ..... C01G 53/10; C22B 23/043; H01M 4/5815
See application file for complete search history.

(56) References Cited

U.S. PATENT DOCUMENTS

2022/0048790 A1  2/2022  Minami
2022/0055916 A1* 2/2022  Ishida .................. C22B 23/043
(Continued)

FOREIGN PATENT DOCUMENTS

CN  101768665 A    7/2010
CN  113321248 A *  8/2021  ............... B01D 9/00
(Continued)

OTHER PUBLICATIONS

Machine translation of JP2017115179, pulication date Jun. 29, 2017.*

(Continued)

*Primary Examiner* — Jun Li
(74) *Attorney, Agent, or Firm* — HSML P. C.

(57) ABSTRACT

A method for producing a nickel sulfate solution includes a leaching step of leaching a nickel cathode in sulfuric acid under a high temperature and a high pressure to produce a leachate, a neutralization step of neutralizing the leachate produced in the leaching step to produce a neutralized solution, and a filtration step of filtering the neutralized solution produced in the neutralization step to produce a filtrate.

1 Claim, 2 Drawing Sheets

(51) Int. Cl.
    *C22B 3/00*     (2006.01)
    *H01M 4/58*     (2010.01)
    *H01M 10/54*    (2006.01)
    *B09B 101/16*   (2022.01)
    *H01M 4/02*     (2006.01)

(56) References Cited

U.S. PATENT DOCUMENTS

| 2023/0049318 | A1* | 2/2023 | Fraser | C01G 53/10 |
| 2024/0051843 | A1* | 2/2024 | Liu | C01G 53/00 |
| 2024/0204277 | A1* | 6/2024 | Van Der Meer | C22B 3/02 |

FOREIGN PATENT DOCUMENTS

| CN | 114959252 A | * | 8/2022 | |
| GB | 1223793 A | | 3/1971 | |
| JP | 2016-003360 A | | 1/2016 | |
| JP | 2017115179 A | * | 6/2017 | |
| JP | 2021008654 A | | 1/2021 | |
| JP | 2021080124 A | | 5/2021 | |
| JP | 2021110024 A | | 8/2021 | |
| JP | 7185090 B1 | * | 12/2022 | C01D 15/02 |
| KR | 101191042 B1 | | 10/2012 | |
| KR | 1020200078199 A | | 7/2020 | |
| KR | 102154599 B1 | | 9/2020 | |
| KR | 2266892 B1 | * | 6/2021 | |
| KR | 10-2021-0152270 A | | 12/2021 | |
| RU | 2178931 C1 | | 1/2002 | |
| RU | 2364641 C2 | | 8/2009 | |
| WO | WO-2019090389 A1 | * | 5/2019 | C01G 53/04 |
| WO | 2020066262 A1 | | 4/2020 | |
| WO | WO-2020129396 A1 | * | 6/2020 | C01G 53/10 |
| WO | WO-2021105365 A1 | * | 6/2021 | C01G 53/10 |
| WO | WO-2021226719 A1 | * | 11/2021 | C22B 3/165 |
| WO | 2022053448 A1 | | 3/2022 | |
| WO | WO-2022094706 A1 | * | 5/2022 | C01B 17/96 |

OTHER PUBLICATIONS

International Search Report (with English translation) and Written Opinion issued in PCT/KR2023/004406, dated Sep. 26, 2023, 5 pages provided.

* cited by examiner

METHOD FOR PRODUCING NICKEL SULFATE SOLUTION FOR SECONDARY BATTERY FROM NICKEL CATHODE

TECHNICAL FIELD

The present invention relates to a method for producing a nickel sulfate solution for a secondary battery from a nickel cathode.

BACKGROUND

Demand for secondary batteries is increasing as the IT industry and the markets for electric vehicles and energy storage system (ESS) are expanded. Accordingly, demand for nickel sulfate, which is used as a raw material for a cathode material of a secondary battery, is also increasing.

Conventionally, a nickel sulfate solution has been produced through a leaching process and an impurity purification process using a raw material such as a nickel concentrate, a mixed hydroxide precipitate (MHP) cake containing nickel, or the like. However, when a nickel sulfate solution is produced by leaching a raw material containing nickel in such a method that oxygen gas or ozone is added as an oxidizing agent under an atmospheric pressure condition, there is a problem in that the leaching efficiency is lowered.

SUMMARY

It is an object of the present invention to provide a method for producing a nickel sulfate solution, which is capable of enhancing the leaching efficiency while adding sulfuric acid and oxygen gas and/or nitrogen gas.

According to one embodiment of the present invention, there is provided a method for producing a nickel sulfate solution, including: a leaching step of leaching a nickel cathode in sulfuric acid under a high temperature and a high pressure to produce a leachate; a neutralization step of neutralizing the leachate produced in the leaching step to produce a neutralized solution; and a filtration step of filtering the neutralized solution produced in the neutralization step to produce a filtrate.

According to one embodiment of the present invention, oxygen gas may be added in the leaching step.

According to one embodiment of the present invention, nitrogen gas may be added in the leaching step.

According to one embodiment of the present invention, the leaching step may be carried out at 170 to 200° C.

According to one embodiment of the present invention, nickel powder may be added in the neutralization step.

According to one embodiment of the present invention, a nickel concentration in the neutralized solution after the neutralization step may be 120 to 140 g/L.

According to the present invention, it is possible to provide a method for producing a nickel sulfate solution, which is capable of enhancing leaching efficiency by adding oxygen gas and/or nitrogen gas under a high temperature and a high pressure.

According to the present invention, it is possible to provide a method for producing a nickel sulfate solution, which is capable of producing a nickel sulfate solution in a safer and more efficient method by adding nitrogen gas under a high temperature and a high pressure.

DETAILED DESCRIPTION

Embodiments of the present disclosure are illustrated for describing the technical spirit of the present disclosure. The scope of the claims according to the present disclosure is not limited to the embodiments described below or to the detailed descriptions of these embodiments.

According to an embodiment of the present invention, a method for producing a nickel sulfate solution for a secondary battery from a nickel cathode includes a leaching step of adding water, sulfuric acid ($H_2SO_4$), oxygen ($O_2$) gas and/or nitrogen ($N_2$) gas to a nickel cathode under a high temperature and a high pressure.

The method for producing a nickel sulfate solution for a secondary battery from a nickel cathode according to the present invention includes a neutralization step of adding nickel powder to a leachate.

The method for producing a nickel sulfate solution for a secondary battery from a nickel cathode according to the present invention includes a filtration step of filtering a neutralized solution and separating the neutralized solution into a filtrate and a cake.

Figure 1:
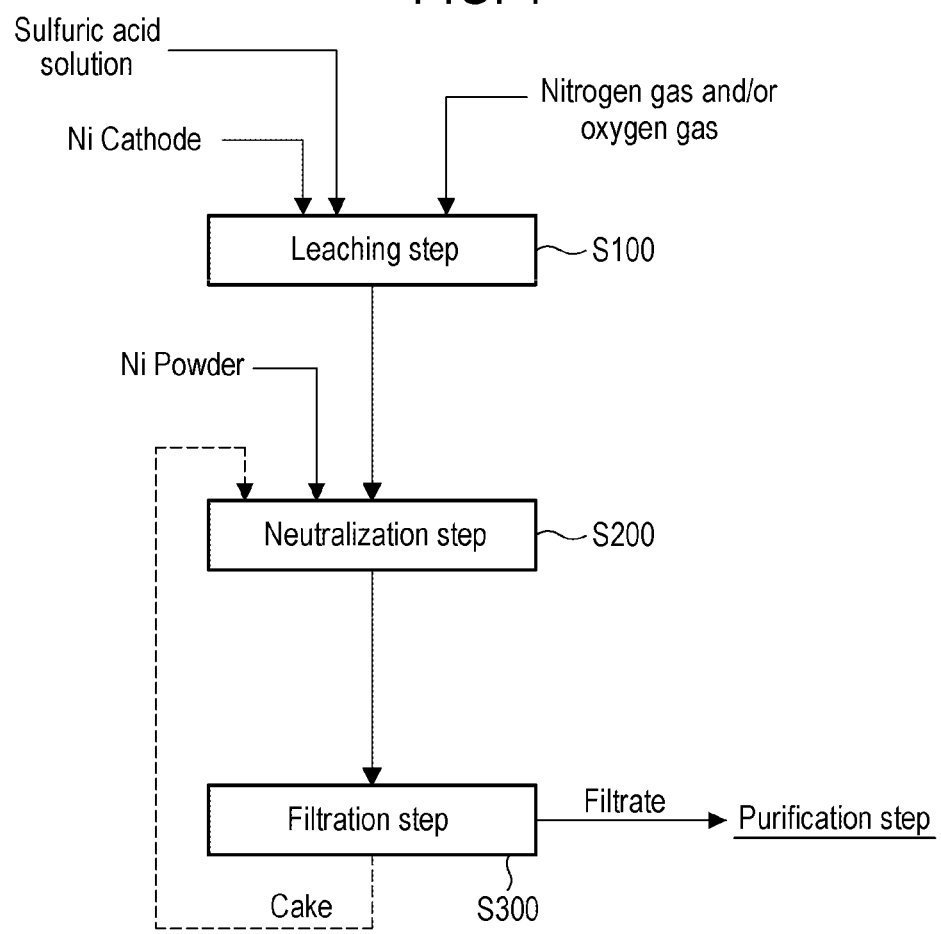
FIG. 1 is a flowchart showing a process for producing a nickel sulfate solution for a secondary battery from a nickel cathode.

Hereinafter, the method according to the present invention will be described in detail with reference to FIG. 1.

Leaching Step (S100)

The leaching step (S100) may include a step of cutting a nickel cathode into an appropriate leaching size, a step of putting the cut nickel cathode into an autoclave in an amount of about 2 equivalents of a target nickel concentration, and a step of performing a reaction under a condition of adding about 1 equivalent of sulfuric acid, oxygen gas and/or nitrogen gas at a temperature of 170° C. to 200° C. and a pressure of 8.5 bar to 16 bar for 5 to 24 hours. The nickel cathode may be cut into, for example, a size of 2 to 10 cm. As used herein, the term "target nickel concentration" may be a nickel concentration in the neutralized solution after the neutralization step (S200) described later. Such a target nickel concentration may be set to an appropriate value in consideration of the solubility and temperature-dependent crystallization of nickel. If the nickel concentration after the neutralization step is less than 120 g/L, the efficiency in the subsequent crystallization step is lowered. If the nickel concentration after the neutralization step is larger than 140 g/L, nickel may be crystallized in the neutralization step when the temperature decreases. This may cause a loss of nickel during filtration. Preferably, the target nickel concentration may be 120 to 140 g/L. If the reaction in the leaching step (S100) is performed at a temperature of less than 170° C., the solubility of nickel is low, thereby lowering the efficiency. If the temperature exceeds 200° C., there is no significant increase in the dissolution rate. Therefore, preferably, the leaching step (S100) may be performed at a temperature of 170° C. to 200° C.

In one embodiment of the present invention, if the target nickel concentration is 120 g/L, the nickel cathode may be cut into a size of 2 to 10 cm and added in an amount of 2 equivalents (240 g/L), and 1 equivalent (200 g/L) of sulfuric acid may be added. Thereafter, the leaching step (S100) may be performed by adding oxygen gas at a temperature of 170° C. to 180° C. or by adding nitrogen gas at a temperature of 180° C. to 200° C.

When oxygen gas is added, a reaction may occur in which the added nickel reacts with sulfuric acid to become nickel sulfate, and hydrogen ions react with oxygen gas to produce water. At this time, a reaction in which a hydrogen gas is generated may also occur simultaneously. When oxygen gas is added, oxygen gas acts as an oxidizing agent to make the nickel leaching efficiency higher than when nitrogen gas is added. Reaction formulae in the case of adding oxygen gas are represented as follows.

$$Ni+H_2SO_4+\tfrac{1}{2}O_2 \rightarrow NiSO_4+H_2O \qquad (1)$$

$$Ni+H_2SO_4 \rightarrow NiSO_4+H_2 \qquad (2)$$

When nitrogen gas is added, a reaction may occur in which the added nickel reacts with sulfuric acid to become nickel sulfate and generate a hydrogen gas. In this case, since nitrogen gas is an inert gas having a very low reactivity, the hydrogen gas can be removed by discharging nitrogen gas together with the hydrogen gas. Therefore, when nitrogen gas is added, safety can be achieved as compared with the case where oxygen gas is added. The reaction formula in the case of adding nitrogen gas is the same as the above reaction formula (2).

Oxygen gas and nitrogen gas may be added in the leaching step (S100) together. Nitrogen gas may reduce the partial pressure of the hydrogen gas generated when oxygen gas is added, which makes it possible to perform a safer work.

In order to accelerate the leaching of nickel, a stirrer may be installed in the autoclave to dissolve the nickel cathode while stirring.

Neutralization Step (S200)

The neutralization step (S200) is a step of neutralizing the leachate to a target pH range by adding nickel powder to the leachate when the leaching reaction has proceeded in the autoclave.

Thereafter, in order to concentrate the nickel sulfate solution by evaporation, it is necessary to lower the acidity. Since nickel is no longer leached into the solution when the pH range is 6 to 7 or more, the preferred pH range may be 5.0 to 7.0. Preferably, the solution may be neutralized to pH 6 through the neutralization step (S200). The neutralization reaction formula is the same as the above reaction formula (2).

Since the purpose of the neutralization step (S200) is to neutralize the acidity of sulfuric acid present in the leachate, an appropriate amount of nickel powder that can efficiently achieve the preferred pH may be added. In the neutralization step (S200), for example, 1.5 to 3 equivalents of nickel powder may be added. Preferably, 2 equivalents of nickel powder (e.g., 12 g/L of nickel powder if the final acidity of the leachate is 10 g/L) may be added. In the case of using nickel powder, the neutralization reaction occurs well due to high reactivity. Therefore, it is preferable to use nickel powder. However, the neutralizing agent is not limited to the nickel powder as long as it can achieve the purpose of neutralization.

In the leachate, when oxygen gas is added at 180° C., the final acidity may be about 8 g/L, and when nitrogen gas is added at 180° C., the final acidity may be about 50 g/L. In addition, when nitrogen gas is added at 200° C., the final acidity may be about 38 g/L. The addition of nitrogen gas makes the final acidity higher than the addition of oxygen gas. Therefore, a larger amount of nickel powder may be required to neutralize sulfuric acid. However, as for the risk of explosion of a hydrogen gas, the addition of nitrogen gas may be a safer method than the addition of oxygen gas.

Filtration Step (S300)

Since the metallic nickel not dissolved in the leaching step (S100) and the neutralization step (S200) remains in the neutralized solution as a solid component, the neutralized solution is transferred to and filtered by a filtration device. The nickel sulfate solution as a filtrate is sent to a purification step, and the cake is put into the neutralization step again. Nickel sulfate in the filtrate is crystallized through the purification step.

Example 1

In this example, a nickel sulfate solution was produced by leaching a nickel cathode in sulfuric acid. 2 equivalents of nickel cathode, 1 equivalent of sulfuric acid, and oxygen gas were added based on the target nickel (Ni) concentration of 120 g/L. A reaction was carried out at 170° C. (8.5 bar) and 180° C. (10.5 bar) for 24 hours. The dissolution rates according to the reaction time are shown in Table 1 below.

In the neutralization step (S200), 2 equivalents of Ni powder are added to make a solution of 120 g/L of Ni at a temperature of 90° C. and a pH of 6.0.

The neutralized solution was filtered, the filtered nickel sulfate solution was sent to the purification step, and the cake was put into the neutralization step (S200) again.

TABLE 1

| Reaction time (hr) | | 0 | 3 | 10 | 15 | 20 | 24 |
|---|---|---|---|---|---|---|---|
| 170° C. | Ni dissolution rate (%) | 0 | 37 | 55 | 74 | 80 | 80 |
| | Acidity (g/L) | 200 | 127 | 91 | 53 | 41 | 40 |
| 180° C. | Ni dissolution rate (%) | 0 | 52 | 79 | 89 | 95 | 96 |
| | Acidity (g/L) | 200 | 97 | 42 | 23 | 10 | 8 |

Example 2

2 equivalents of nickel cathode, 1 equivalent of sulfuric acid, and nitrogen gas rather than oxygen gas were added. A reaction was carried out at 180° C. (10.5 bar) and 200° C. (16 bar) for 24 hours. The dissolution rates according to the reaction time are shown in Table 2 below.

The neutralization step (S200) and the filtration step (S300) are the same as those of Example 1.

TABLE 2

| Reaction time (hr) | | 0 | 3 | 10 | 15 | 20 | 24 |
|---|---|---|---|---|---|---|---|
| 180° C. | Ni dissolution rate (%) | 0 | 38 | 61 | 69 | 75 | 75 |
| | Acidity (g/L) | 200 | 125 | 79 | 63 | 51 | 50 |
| 200° C. | Ni dissolution rate (%) | 0 | 57 | 79 | 80 | 81 | 81 |
| | Acidity (g/L) | 200 | 87 | 42 | 40 | 39 | 38 |

Comparative Example 1

2 equivalents of nickel cathode, 1 equivalent of sulfuric acid, and oxygen gas were added. A reaction was carried out at 95° C. (and atmospheric pressure) for 24 hours. The dissolution rates according to the reaction time are shown in Table 3 below.

The neutralization step and filtration step are the same as those of Example 1.

Comparative Example 2

2 equivalents of nickel cathode, 1 equivalent of sulfuric acid, and ozone were added.

A reaction was carried out at 95° C. (and atmospheric pressure) for 24 hours. The dissolution rates according to the reaction time are shown in Table 3 below.

The neutralization step and filtration step are the same as those of Example 1.

TABLE 3

| Reaction time (hr) | | 0 | 3 | 10 | 15 | 20 | 24 |
|---|---|---|---|---|---|---|---|
| Comparative example 1 | Ni dissolution rate (%) | 0 | 1 | 2 | 2 | 2 | 2 |
| | Acidity (g/L) | 200 | 198 | 197 | 196 | 196 | 196 |
| Comparative example 2 | Ni dissolution rate (%) | 0 | 2 | 6 | 10 | 16 | 17 |
| | Acidity (g/L) | 200 | 197 | 189 | 180 | 169 | 167 |

It can be seen that the Ni dissolution rates are very low in Comparative Example 1 in which oxygen gas was added at the atmospheric pressure and Comparative Example 2 in which ozone was added at the atmospheric pressure. On the other hand, the dissolution rates are very high in Examples 1 and 2 as compared with the Comparative Examples.

Figure 2:
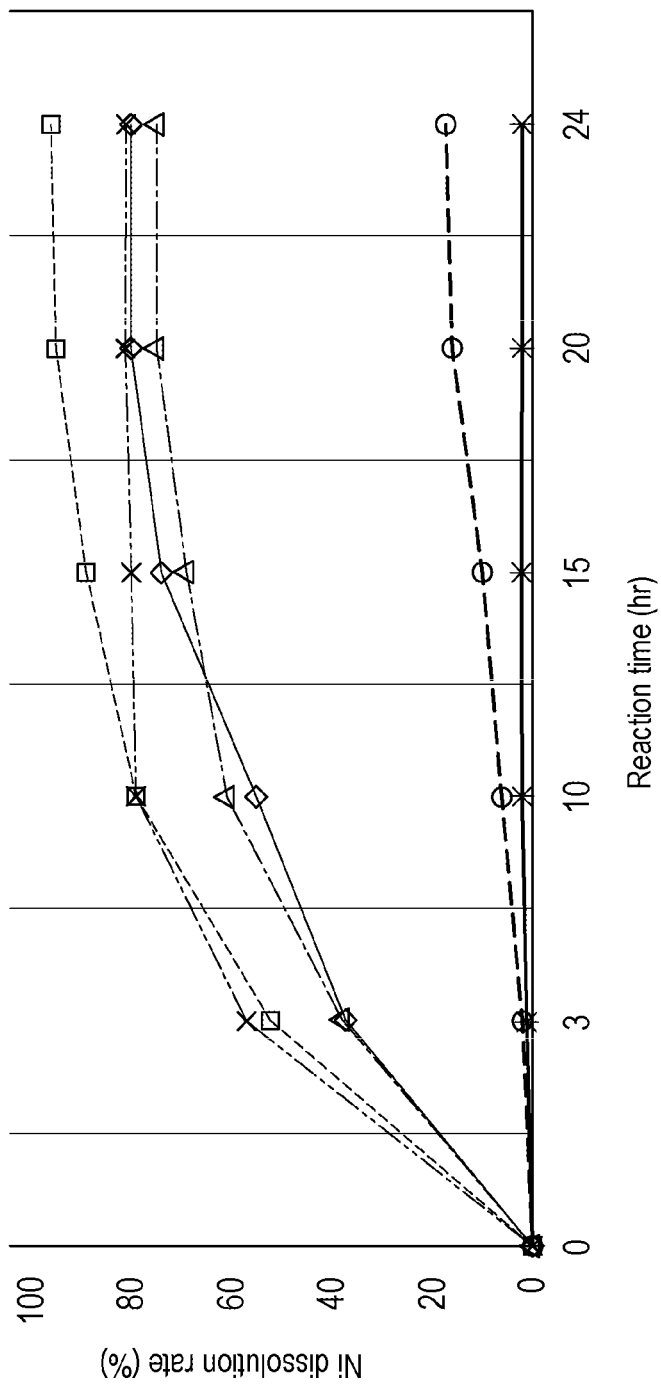
FIG. 2 is a graph showing the Ni dissolution rates in Examples and Comparative Examples after a leaching step.

FIG. 2 is a graph showing the Ni dissolution rates in the Examples and the Comparative Examples after the leaching step. The dissolution rates in the Examples and the Comparative Examples can be compared.

That is, in Examples 1 and 2, nickel sulfate solutions can be efficiently produced by adding oxygen gas or nitrogen gas under a high temperature and a high pressure.

It should be understood that the embodiments described above are illustrative in all respects and not limitative. The scope of the present invention is defined by the claims rather than the detailed description. All changes or modifications derived from the meaning and scope of the claims and equivalent concepts thereof should be construed as being included in the scope of the present invention.

What is claimed is:

1. A method for producing a nickel sulfate solution, comprising:
   leaching a nickel cathode in sulfuric acid under a temperature of 170° C. to 200° C. and a pressure of 8.5 bar to 16 bar while introducing at least one of oxygen gas and nitrogen gas to produce a leachate;
   neutralizing the leachate produced in the leaching step by adding nickel powder to produce a neutralized solution with a pH 5.0 to 7.0;
   filtering the neutralized solution produced in the neutralizing to produce a filtrate and a cake that includes undissolved nickel; and
   adding the cake to the neutralizing,
      wherein a nickel concentration in the neutralized solution after the neutralizing is 120 to 140 g/L wherein the nickel cathode concentration in the leaching step is 2 equivalents of the nickel concentration in the neutralized solution after the neutralizing; and
      wherein the sulfuric acid concentration in the leaching step is 1 equivalent of the nickel concentration in the neutralized solution after the neutralizing.

* * * * *